Feb. 11, 1936.  E. GRETENER  2,030,446
APPARATUS FOR USE IN COLOR PHOTOGRAPHY
Filed Dec. 23, 1933
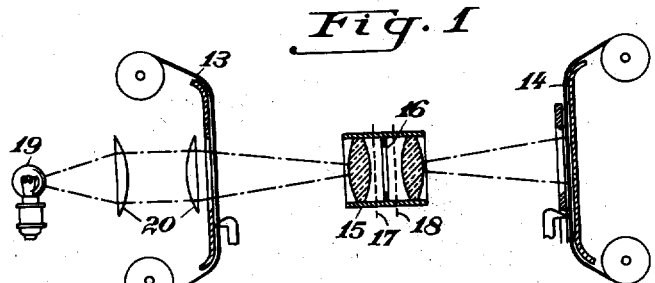
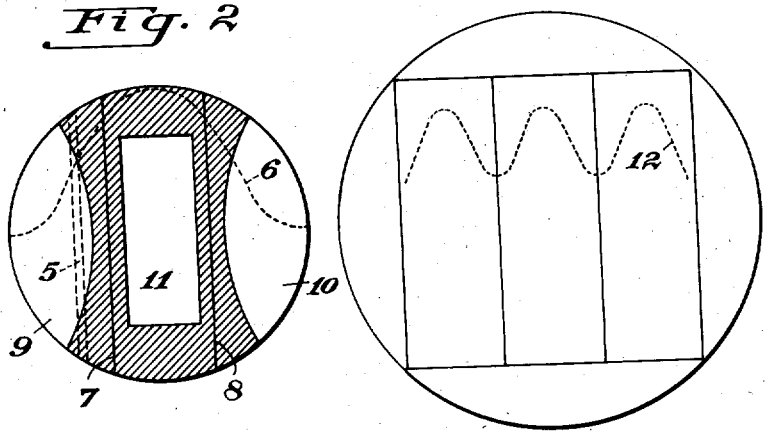
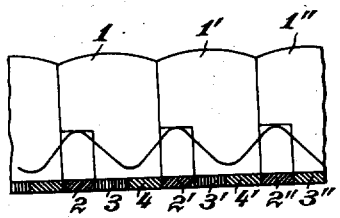
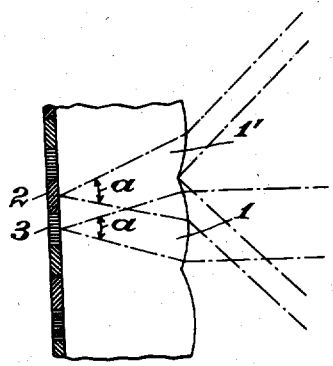
EDGAR GRETENER
INVENTOR.
BY- Gifford, *&c.*
ATTORNEYS.

Patented Feb. 11, 1936

2,030,446

UNITED STATES PATENT OFFICE 2,030,446

APPARATUS FOR USE IN COLOR PHOTOGRAPHY

Edgar Gretener, Berlin-Siemensstadt, Germany, assignor to Opticolor Aktiengesellschaft, Glarus, Switzerland, a corporation of Switzerland Application December 23, 1933, Serial No. 703,798
In Germany December 29, 1932

2 Claims. (Cl. 88—24)

This invention relates to an apparatus for use in color photography and more particularly for use in copying images on lenticulated films which serve for reproducing colored views.

It is well-known in the art to use a copying objective which reproduces the original film on the duplicate film and which is provided with a special diaphragm. This diaphragm is seen from the films in the same distances as the multicolor screens are seen when the views are taken or projected. The opening of the diaphragm is divided by stripes which conceal those regions of the aperture of the copying objective which correspond to the borders between adjacent zones of the multicolor screen. As, generally, the images on the original film are positive ones, got by inversal, the said diaphragm decreases the light-diffusion from one color to the other ones.

This invention relates to an improvement of the apparatus used in the above described well-known printing process and particularly of the diaphragms used for performing the same. It was found that the images on the duplicate film are better and have better colors when the diaphragm is so constructed that some symmetry conditions are fulfilled.

As always the light which passes a region corresponding to one zone of the multicolor screen, of the emulsion on the original film is scattered so that diffuse light also passes the other zones and as this defect may not be wholly suppressed even by the use of diaphragms of the known type, it is necessary for getting nevertheless good projected images to take care that the diffusions are symmetrical for the different colors. The said diffusions occur also in the taking and projecting process. They could be made symmetrical by suitably shaped multicolor screens which would, however, cause great losses of light. So all unsymmetrical diffusions are compensated for by the copying process as then losses of light may easily be balanced by lowering the speed of the copying process.

The details of the invention may be explained by the help of the annexed drawing of which Fig. 1 shows a sectional view of a copying device, Fig. 2 the front view of a diaphragm of the new type, Fig. 3 the front view of a diaphragm used for constructing the diaphragm of Figure 2, Figure 4 a sectional view of a part of a lenticulated film, Fig. 5 some curves which represent the transparencies of the emulsion layer, Fig. 6 a sectional view of a part of a lenticulated film and the path of the light beams through it.

Referring first to Fig. 4 there are drawn the lenticular elements 1, 1' and 1''. In the emulsion layer behind each lens three zones 2, 3, 4 or 2', 3', 4' or 2'', 3'', 4'' are corresponding to the respective zones of the multicolor screen which was employed in a well-known manner when the film was exposed. It is assumed that the three differently colored zones are of equal width, so that also the widths of the stripes 2, 3, 4, 2', 3', 4', 2'' 3'', 4'' are equal. As it is preferable when the dimensions are chosen in this manner the following explanations are based upon this presumption without being necessarily restricted to it.

When now a view is taken on the film, the layer is after the reversal process partly transparent. If the taken object is colored so that its light rays only pass through one zone of the filter, the transparencies of the layer ought to be represented by the line of Fig. 4, which rises rectangularly over the zones 2, 2', 2'' and so on, and which is similarly shown in Fig. 5.

It is known that an improvement may be got by arranging a diaphragm in the photographic objective concealing the borders between the filter-zones. Then the real transparencies are given by the curved line of Fig. 5 instead of the theoretical broken line. The maxima of the curved line of Figure 5 are more distinct and sharper than those of the corresponding curve of Figure 4. But their height is lowered from which fact results that the concealing must not be too much augmented.

The circumstances are similar in the projection process. There too light-diffusing occurs which produces color degradations. Also this effect may be, at least partially, compensated for by the use of diaphragms which, however, reduce the luminosity. The result of the described diffusion is that the colors seem to be pale and that no intense and deep colors may be got. If for instance a film is projected with a concealed red zone which was taken through a filter with concealed blue and green zones, there ought to be, in contradiction to the experimental result, no light on the projection screen. In consequence of the light-diffusion the red color loses its saturation and seems pale. The point of the color triangle which represents the red got by projecting an exposed film is displaced towards white.

An utmost disturbing effect of the diffusion which is to be avoided by the invention consists in the fact that the degradation of the colors is of unsymmetrical manner. Generally the diffusion from one marginal zone to the other one is much weaker than from one marginal zone to the central zone or from the central zone to one marginal zone. The consequence is that some colors can not be projected in any satisfactory manner while other colors which are of smaller importance are nearly correctly projected. If for instance the central zone is red and the marginal ones green and blue, the effective red on the projection screen is much more degradated towards white than blue and green as the light-diffusion between the central zone and the two lateral zones is rather strong, the diffusion from green to blue and from blue to green being weak. Sometimes it is even possible that the very white point is lying near the borders of triangle formed by the effective projection colors. Then it is not possible to get pure white.

Such lack of symmetry must be avoided. A condition for this aim is to give the zones an equal breadth. Further the unsymmetry has its origin in a light-scattering by the neighbouring lenticular elements and in the circular shape of the multicolor screen which causes the central zone to touch the lateral ones by long straight lines while the two marginal zones, being curve-shaped at their outer borders, are only touching each other in one point when they are periodically repeated as is affected by the lenticular elements. Both reasons may be described in full detail by the help of Figures 2 and 6.

Fig. 6 refers to the case that the lenticular film of which a small piece has been drawn in sectional view is illuminated from the unembossed side and that a projection objective with the multicolor screen is arranged on the lenticulated side. Then conically shaped light-bundles of the angular opening $a$ pass through all points of the layer. That light-cone which passes through the center of the zone 3 reaches as a whole the lenticular element 1 and is refracted in such a manner that it passes through the center of the multicolor screen. On the contrary, only a part of the other light cone which passes through the zone 2 represented in Figure 6 reaches the lenticular element 1, another part of considerable value striking the lenticular element 1'. This last named part is so refracted that it does not reach the objective. So only a part of the light reaches that zone of the screen corresponding to the zone 2. Therefore the intensity of the light decreases more and more towards the margins of the lenticular elements and the most intense diffusion occurs between the central and the lateral zones but not between the lateral ones.

This effect of light-scattering by the neighbouring elements is augmented by another one, which may be explained with respect to Figure 2. This figure shows a front-view of the plane of the diaphragm which may be employed for projection purposes. It is without influence in the following explications, if the films are projected on a screen or if they are projected on another film for reproducing the record. Even in the taking process similar anomalies occur.

When a film with cylindrically shaped lenticular elements running parallel to the strip is projected with the help of an objective which has a circular aperture as is drawn in the figure, each vertical small strip of the aperture is passed by a certain quantity of light being a function of the situation of said strip. It is small at the sides and great at the center. The reason is not only the light scattering by the neighbouring lenticular elements but also the circular shape of the aperture. The integral quantity of light passing by the zone 5 may, for instance, be tested and drawn as ordinate. When this is done for the whole breadth of the aperture, the dashed line 6 is got. This is a further reason for the fact that the diffusion between the central and the lateral zones is much greater than the diffusion between the two marginal zones. Such a degradation of colors occurs in every projection process, for producing a cinematographic view as well as for drawing duplicates. It may be considerably decreased by shaping the aperture of the copying objective as is represented in Figures 1 and 2.

In Figure 1 the film 13 is to be reproduced, while the film 14 is to be exposed by the help of the objective 15 which contains a diaphragm 16, represented in Figure 2 in front view. It is seen from the films at the planes 17 or 18 which have from the films the same distances as the images of the corresponding images in the taking or projecting process. The film 13 is lighted by a light source 19 and a condenser 20.

The aperture of the objective is divided into three stripes of equal breadth by the lines 7 and 8. The diaphragm 16 is placed within the objective and conceals the lines 7 and 8. It has three apertures. These are the unhatched areas in Figure 2, viz. the two diangles 9 and 10 and the central rectangle 11. The apertures are so shaped that the centers of gravity of the three transparencies on the duplicate film are lying at equal distances from each other. For this purpose the areas 9 and 10 are so shaped that their centers of gravity have a distance from the center of the aperture 11 greater than one third of the diameter. By this means a duplicate film is got which is characterized by the fact that the stripes behind the lenticular elements have equal distances from each other though these stripes are drawn towards the central stripe behind each lens on the original film.

It is even possible and has proved of high importance for practical work to use a diaphragm in the copying process which has such apertures that the centers of gravity of the lateral apertures have still greater distances from the center of the central aperture. Then the centers of gravity of the lateral stripes behind any lenticular element of the duplicate film have distances from the central stripe which are greater than one third the breadth of an element, thus enabling one to renounce on a diaphragm considerably decreasing the luminosity of the projection objective, as the stronger diffusion between the central and the lateral zones is already compensated for. The degradations of the projected colors may, by this means, be made wholly symmetrical.

If therefore a screen is used, the central zone being red and the two others blue and green, the lack of saturation by additions of white is for all colors the same. Each of the three colors gets the same percentage of white addition. Only the addition to blue may sometimes be somewhat greater without being observable.

The exact shape of the diaphragms may be got by pure calculations. But it is more preferable to use a diaphragm of approximately the correct shape and to improve it by some trials. These trials will be first described for the case that the transparencies on the duplicate film shall have equal distances from each other.

The original film is exposed behind the taking objective of which all but one zones are concealed. The open zone may for instance be a lateral one. This film is printed with the help of the approximately correct diaphragm in the objective and the duplicate is projected with an objective with rectangular aperture as is represented in Figure 3. The breadth of this aperture must be equal to that of the projection objective and have the same distance from the film, including the action of the optical system. Now the intensities of light passing through the three zones are tested by concealing two zones and leaving the third open. The proportions of the three intensities are a function of the color degradation by light-diffusion.

This experiment is twice repeated whereby in the taking process the other zones remain open. Having at last got the proportions for the blue, red and green monochrome it is easily seen if the degradations are the same for red, green and blue, or, if not, in what manner the diaphragm of the printing objective must be changed for equalizing them.

Then another duplicate is drawn from the original with the new diaphragm and the degradations are once more tested. After some steps the correct diaphragm is got.

It is also possible to expose an original film through the open taking objective directed towards a white object. The duplicate drawn from such original with the help of the diaphragmed printing objective is projected and the intensities of light passing through small stripes of the projection objective parallel to the lenticulations are tested. Thus the curve 12 of Figure 3 is got corresponding to curve 6 of Figure 2. It is assumed that the duplicate is drawn with the help of a false diaphragm so that the maxima of curve 12 are unsymmetrical. The diaphragm must be altered till the curve is —at least approximately— symmetrical.

If the duplicate film is destined to be projected through an objective with circular aperture, the same steps may be taken with the only difference that the correct projection system is used for testing the degradations.

It is preferable to combine with the effect of the new printing diaphragms, to render equal degradations of color the other effect that the stripes behind a lenticular element have equal transparencies when a white or grey object was taken. This considerably decreases the tendency to color dominants in the light and dark parts of the views. Generally, for this purpose, the central zone must be smaller than the lateral ones.

The new apparatus is not limited to three zones. There are only small alterations which are easily taken by anybody learned in the art, when more than three zones of three or more than three colors are used. Then, too, the color degradations must be equal.

I claim:

1. In an optical system for use with lenticulated films having three color records behind each lenticulation, a film gate through which such a film is adapted to be moved, a diaphragm through which light may pass to or from said film in the gate, means to form an image of said diaphragm at said gate, said diaphragm having three apertures spaced apart transversely of the lenticulations on the film, the central one of said apertures being rectangular in shape and the side apertures being separated from the central aperture by opaque strips said strips having curved edges forming the boundaries of said side apertures.

2. In an optical system for use with lenticulated films having three color records behind each lenticulation, a film gate through which such a film is adapted to be moved, a diaphragm through which light may pass to or from said film in the gate, means to form an image of said diaphragm at said gate, said diaphragm having three apertures spaced apart transversely of the lenticulations on the film, the central one of said apertures being rectangular in shape and the side apertures being separated from the central aperture by opaque strips said strips having curved edges forming the boundaries of said side apertures, and the centers of gravity of said apertures being equally spaced from each other.

EDGAR GRETENER.